Sept. 15, 1964     T. J. SKOTNICKI ETAL     3,149,019

FLEXIBLE RESINOUS INSULATING SHEET STRUCTURE

Filed Dec. 15, 1955

INVENTORS
THADDEAUS J. SKOTNICKI
BERTRAND Y. AUGER
CHARLES K. HEASLEY

BY Carpenter, Abbott, Coulter & Kinney
ATTORNEY

3,149,019
FLEXIBLE RESINOUS INSULATING SHEET STRUCTURE

Thaddeus J. Skotnicki, New Canada Township, Ramsey County, Bertrand Y. Auger, Roseville, and Charles K. Heasley, Birchwood, Minn., assignors to Minnesota Mining & Manufacturing Company, St. Paul, Minn., a corporation of Delaware
Filed Dec. 15, 1955, Ser. No. 553,284
1 Claim. (Cl. 161—82)

The present invention relates to stable heat-curable resinous sheet structures, to the use thereof in effecting highly efficient insulative wraps about electrical conductors and to methods of making the said structures.

Coils of electrical conductors used, for example, as armature windings in high voltage electric motors, transformers and the like, must be effectively insulated from both one another and from the exterior. The insulation must be durable, tough, shock resistant and of a high insulative nature. To that end they must be void-free and free of entrapped air. Entrapped air in the insulation ionizes, particularly at high voltage, and causes corona break-down and destruction of the insulation with consequent failure of the insulated devices.

Heretofore, the insulation of armature windings for motors and coils for transformers has generally been carried out by first dipping the entire coil in an insulating varnish followed by a baking for several hours. The coil is then alternately painted with insulating varnish and wrapped with a film of varnished cambric. The entire coil is then wrapped with a porous fabric tape, dipped several times in varnish and baked for several hours to cure the resin. In such an insulation, entrapped air in the insulation is practically unavoidable. Where the coils or windings are to be employed in conditions of high heat and voltage and where entrapped air is intolerable, the dipping of the coil prior to the final baking is carried out in an air evacuated apparatus whereby most of the entrapped air is forcibly displaced by the impregnating insulating varnish. The coil is then baked as before.

Such prior art procedures are time-consuming, tedious, and often necessitate cumbersome and costly equipment. Moreover, the degree of impregnation and displacement of entrapped air, is not uniform from coil to coil. Each individual coil must be insulated with a large factor of safety to insure that each will pass quality control minimums.

Attempts have been made to obviate these cumbersome procedures. For example, tape structures consisting of woven glass cloth impregnated with a heat-setting resinous material have been employed as wrappings around coils or conductors. Although such structures have provided some improvement, the old procedures have not been abandoned. Inherently, the heat-setting resins employed, though ostensibly solid and in many instances tack-free in the tape structure, become rather fluid liquids upon being subjected to heat prior to their solidification in final heat-cured form. In order to avoid runoff of the liquid resin, with resulting "voids" in the insulation, it has been necessary to employ resin confining molds during the cure of the resins. Moreover, high pressures have been necessary during cure in order to avoid entrapped air in the insulation.

The present invention provides, for the first time, insofar as we are aware, heat-curable stable resinous tape structures which may be employed in the wrapping of electric motor armatures, transformer coils, etc., and subsequently heat-cured to a tough, highly insulative coating which is substantially void-free and free of entrapped air without need of confining molds or presses. Resin runoff is substantially completely avoided. Our structures may be conveniently employed in roll form. The rolls may be stored at room temperatures or slightly above for extended periods, months or even years, yet still be as satisfactory in use as they were shortly after manufacture.

In providing our novel resinous sheet structures we employ a high resin-retentive fibrous mat having the unique capacity to retain high quantities of resin even when the latter exists in a highly fluid condition. Although the resin-retentive fibrous mat, of itself, is relatively weak and easily destructible and is not continuously impregnable by conventional coating procedures, it provides surprising reinforcing qualities in combination with the resinous material employed. The invention provides novel procedures whereby the easily destructible resin-retentive fibrous structures may be easily and uniformly continuously impregnated with liquid resin compositions in producing the novel structures hereof.

The invention may be further and more clearly illustrated upon reference to the accompaying drawings, the description thereof and to the specific illustrative examples which follow. Referring now to the drawings, in which like reference characters indicate corresponding parts in the several views.

Figure 1:
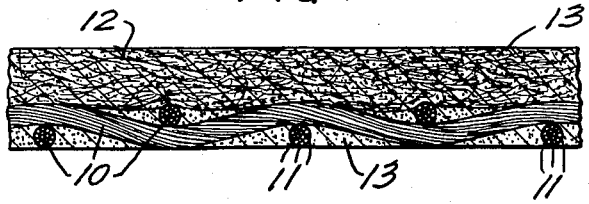
FIGURE 1 is a view in section of one of the resinous insulative sheet structures hereof.

Referring now to FIGURE 1, a modification of the resinous sheet material of the present invention contains a fabric of interwoven strands 10 composed of many individual filaments 11. A resin-retentive fibrous mat 12 formed of very fine microfibers intertangled together without adhesion is superimposed upon the woven fabric, the fabric and the mat being unified into a single structure by impregnation with a stable heat-curable resin 13. The structure is completely filled by the resin 13 such that substantially all the filaments and fibers are surrounded with substantially no entrapped air being present.

A large amount of heat-curable resin composition in a solid or heavily viscous state is retained by the fibrous mat, an amount in the order of eight times its own weight or more. The woven fabric, on the other hand, retains relatively slight amount of the resin composition, the amount being about one-half its own weight.

The resinous sheet structure is generally formed on and releasably engaged with a flexible carrier member, from which the sheet structure is readily stripped when ready for use, in a manner to be hereinafter described. It is, when in contact with the carrier, conveniently rolled therewith into roll form in which the exterior surface of the resin sheet structure is in contact with the under surface of the next succeeding layer. The rolls in this form are sold in commerce for use in the insulation of electrical conductors and the like.

Figure 2:
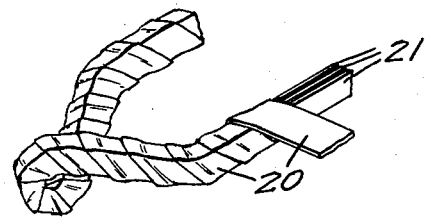
FIGURE 2 is a view in perspective of a portion of a typical armature coil of a high-temperature high-voltage alternating current electric motor partially wrapped with the resinous sheet shown in FIGURE 1.

When the resin sheet structure is to be employed to insulate a group of electrical conductors such as the electric motor armature winding shown in FIGURE 2, the resinous tape taken from the roll is wound under tension equivalent to at least firm hand tension in overlapping spiral windings 20 about the conductors 21 while the carrier sheet is simultaneously stripped and removed from the structure. Several layers of wrappings are generally applied. Due to the flexible somewhat soft nature of the resin in the sheet material, the spiral windings may be uniformly and smoothly applied around the conductors even at bends and corners. When the wrapping is complete, the free end of the resin sheet is then fastened in position. This may be accomplished by wrapping a piece of pressure-sensitive adhesive tape about the conductors to hold the free end in place. Or the free end may be "tacked down" by temporarily applying heat to the free end causing the resin to become slightly tacky and to adhere to the surface with which it is in contact.

The wound coil is then heated without confinement, e.g., placed in an oven, at a sufficient temperature and for a sufficient time to cure the resin. The temperature and time employed will depend in part upon the nature of the resin composition employed.

The stable heat-curable resinous compositions employed are ostensibly solids at room temperature. That is, they may be solids or they may be of an extremely highly viscous somewhat tacky nature. They are not, however, liquids. Before curing, the stable heat-curable resin compositions temporarily liquify. In some instances they liquify to quite a low viscosity. Significantly, however, even though both the woven cloth and the resin-retentive mat of which the tape is composed are substantially completely filled with resin, substantially no resin is lost through "runoff" during the stage in which the resin is a liquid. This is true even though no resin confining mold is employed. However, the liquid resin composition does flow internally within the structure in and about the conductors. An insulative layer substantially free of entrapped air is thereby obtained.

Figure 3:
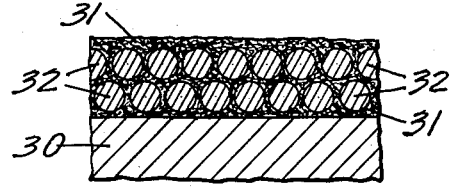
FIGURE 3 shows in section, a portion of a transformer coil winding in which resinous sheet material of the present invention is employed as the insulation.

However, "runoff" during the stage in which the resin is liquid occurs to a considerable extent where a fully impregnated cloth alone is employed, thereby leaving undesirable resin starved spots in the insulative layers. As will be hereinafter shown, runoff occurs where the microfiber mat contains "free" surface resin in addition to that necessary to completely fill it. However, the resin retentive characteristics of the combined fibrous mat and fabric retain from running off not only the resin contained in the mat but, surprisingly, also the resin previously contained within the woven cloth. Hence, the combination retains more resin without run-off than the combined amount that each of the microfiber mat and the woven fabric alone will retain.

Where the high strength imparted by the woven glass fiber cloth is not necessary in the application to which the novel resin tape structures hereof are to be put, such as, for example, in the transformer coil of FIGURE 3, rather unique properties are exhibited by a resin tape consisting of the resin impregnated retentive fibrous mat alone. In this instance, the conventionally employed resin impregnated paper sleeve 30 which surrounds the transformer core is wound spirally with the tape structure 31, previously stripped from the carrier, under only slight tension. The wire conductors 32 are then tightly spirally wound over the resinous tape 31 with successive windings of the conductors 32 being closely adjacent. A second layer of the resin tape 31 is then spirally wound, as before, under slight tension over the conductors 32. A second layer of tightly spirally wound conductors 32 is applied over the resin tape surface. This procedure is repeated until the desired number of coil turns are wound upon the core. The wound structure core is then placed unconfined in a heated oven and the resin cured to a hard firm state. No resin "runoff" occurs. During its liquid stage the resin flows around and about the conductors rendering the insulative layer continuous. Substantially no entrapped air exists in the insulating layers.

In the application of our resinous sheet structures no special and/or cumbersome equipment is necessary. No solvent or excess resin need be present. No confining pressure molding equipment is essential. The unitary resinous sheet structures provide the insulative portion in its entirety. It is merely conveniently and easily stripped from its carrier liner and wrapped or placed into position by hand or machine. No transfer of resin from the sheet to the carrier or to the hands or winding machine occurs. Thus, in employing the novel structure hereof economies and advantages are derived which have been unattained by prior art procedures.

The fibrous resin-retentive mat employed in our novel resinous sheet structures is a dry-laid mat composed of glass microfibers, i.e., fibers of very fine diameter. By dry-laid is meant that the microfibers are air-laid without presence of any binder. Fibers are in no way adhered together. Any unitary strength exhibited by the mat is entirely achieved through the intertangling of the many fibers with one another. The microfibers are not surface treated in any way. In fact, in most instances the mat is formed continuously as the fibers are formed, as for example, where the microfibers are formed generally by the action of streams of hot humid air upon a partially galled globule of glass exuded from an orifice, automatically broken off by the stream after reaching a certain length, and blown or "laid" upon a traveling screen with many similar fibers. Such microfiber mats are available from Glass Fbers, Inc., of Toledo, Ohio, under the trade name "Vitron."

Although the mat is handleable, that is, it may be manually handled in web form with reasonable care or even unwound under uniform even tension from a supply roll mounted on low-friction bearings without tearing apart or breaking up, individual portions and fibers are easily pulled from the mat. It cannot be impregnated with resin by conventional roll-coating or knife-coating techniques. However, herein is provided novel impregnating procedures in which the mat may be easily and conveniently impregnated with resin even though it is of such a fragile nature. The same will now be disclosed in connection with several specific examples which illustrate various embodiments of the present invention. In the examples, ingredients are given in parts by weight unless it is stated otherwise.

*Example I*

Figure 4:
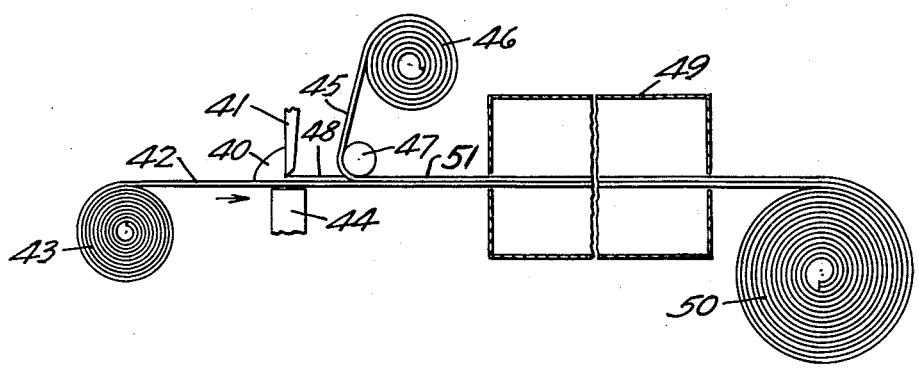
FIGURE 4 is a diagram schematically illustrating a process by which our novel insulative sheet materials are made.

Referring now to FIGURE 4, a resin solution 40 consisting of 50 parts of a heat-setting organo-silicon resin dissolved in 50 parts toluene, presently commercially available from the General Electric Corporation under the trade designation "SR-17," was continuously coated, by means of a coating knife 41 onto a polyethylene treated paper carrier liner 42 unwound from supply roll 43. A heat-setting resin similar to that employed is a heat-convertible polysiloxane consisting of the incompletely condensed reaction product of the hydrolized counterparts of dichlorodimethylsilane, dichlorodiphenylsilane and methyltrichlorosilane in molar ratios of about 3:2:2, respectively, and approximately one percent of zinc octoate based upon the total resin weight. The coating width on the 24 inch wide carrier was approximately 23 inches, leaving approximately ½ inch on each edge of the carrier 42 initially uncoated. A support 44 supported the carrier 42 as the latter was drawn under the knife 41. The coating weight of the resin on a dry basis was 56 grains per 4" x 6" sheet.

A 24 inch wide resin-retentive fibrous mat 45 available commercially from Glass Fibers, Inc., under the trade designation "Vitron E-106," consisting of a randomly laid mat having a nominal thickness of 5-6 mills and a weight of approximately 5.5-6 grains per 4" x 6" sheet formed of extremely fine glass microfibers having an average diameter in the order of .00003 inch and an average length of about ¼ inch, was unwound from a supply roll 46 around idler roll 47 and into superposition with the resin coated carrier 48 to form a resin impregnated structure 51.

The supply roll 46 was mounted on a substantially friction-free mounting which permitted the mat 45 to be withdrawn therefrom without breakage or separation of the mat. Where an especially weak mat is employed the supply roll 46 may be driven.

The idler roller 47 was positioned such that the mat 45 fell of its own weight into contact with the coated carrier 48. If desired the idler roll 47 may be elevated away from the carrier insuring that no portion of the mat which is wet throughout with resin will contact the idler roll surface and be torn apart.

As soon as the mat 45 came into contact with the coated carrier 48 the resin proceeded to flow into and impregnate the mat as the composite was led continuously through a drying oven 49 during which time the solvent was substantially completely evaporated from the resin without cure thereof. The dried composite structure was then wound up in the form of a roll 50. The resin coating weight was such that upon evaporation of the solvent the mat was completely filled with substantially every individual microfiber being fully surrounded by and embedded within the stable heat-curable resin and with the interstices between fibers being filled substantially without presence of entrapped air yet without presence of significant amounts of excess "free" resin on the mat surface. The proper degree of impregnation may, we have found, be determined by observing the composite as it leaves the oven. Where the mat is incompletely filled the "white" appearance of unwet fibers may be seen. On the other extreme, a resin bead may be observed to have leaked from the edge of the composite onto the edges of the carrier and onto the opposite surface thereof where undesirable excess is employed.

The temperature of the oven 49 was approximately 200° F.; the rate of travel of the carrier 42 and the length of the oven 49 were such that a given portion of the composite remained in the oven for approximately 10 minutes in order to dry the resin without cure thereof.

After being allowed to cool, the resulting composite structure containing our novel sheet material rolled up on a carrier was slit into tapes of desired width, which tape structures were then rewound into rolls for shipment in commerce. The resinous sheet structure was of a substantially tack-free nature, the resin being ostensibly a solid. It was easily strippable from the carrier without transfer of the resin to the carrier.

Some of these heat-curable resinous tape structures were employed as electrical insulation between the several conductor windings of a transformer coil as hereinabove described in connection with FIGURE 3. Upon being placed in an oven at 200° C. for 2 hours, the resin of the insulative portion cured to a tough, firm, flexible state. Substantially no resin runoff was observed at the surface of the wound coil. That the slight evidence of resin flow at the surface was insignificant and the interior of the insulative portion substantially free of entrapped air was shown upon subsequent dissection of the coil. No pits or holes indicating the presence of entrapped air were visible to the eye. Each of the individual conductors was seen to be substantially completely and fully surrounded by the resin indicating that resin did flow internally of the structure during cure. The insulative portion was uninterrupted and continuous even where layer interfaces previously existed. Yet, as above noted, the use of the resin-retentive fibrous mat prevented escape of the resin from the structure by way of runoff. Due to the extremely high decomposition temperature of the resin, the embodiment of the present example is particularly suited to uses where high heat will be encountered.

In the present example a specific carrier was employed, viz., a polyethylene treated paper. However, other conventional type well-known sheet materials or treated sheet materials to which adhesives releasably adhere may be employed equally as well. This is true not only of the resin composition employed in Example I but the other suitable resin compositions as well.

The resinous sheet structure of Example I did not contain reinforcing filaments. It was wound under only slight tension. The electrical conductors of the coil were tautly wound to provide compactness. The sheet structure, suprisingly, was sufficiently strong to withstand being wrapped around and about the core and conductors. This is true even though the fibrous mat itself without the resin, in the relatively narrow width employed, would not have withstood the forces of winding without breaking.

Where it is desirable to employ strong sheet materials, for example, to wrap conductors extremely tightly, it is often desirable to employ embodiments of our novel resinous sheet structures which contain reinforcing. Such a structure is above shown in connection with FIGURES 1 and 2. The reinforcing member consists of a fabric formed of twisted strands of continuous surface heated glass filaments which necessarily provide poor resin retentive characteristics. Such a structure is conveniently formed employing the general method above described in connection with FIGURE 4 and in addition laminating a continuous web of the reinforcing to the resin retentive mat 45 where the latter is led around idler roll 47, the two then being superimposed upon resin coated carrier 48 under their own weight. Of course, in such a structure additional resin will be employed beyond that necessary to completely fill the fibrous mat in order to also fully impregnate the reinforcing. Such a structure will now be shown.

*Example II*

| | Parts |
|---|---|
| American Cyanamid "PDL 7–358" (a polyester resin similar to the reaction product of a 1:1 molar ratio of adipic acid and ethylene glycol) | 450 |
| "Atlac 382" (reaction product of a 2:1 molar ratio of maleic anhydride with the reaction product of a 2:1 molar ratio of propylene glycol and bisphenol A) | 2550 |
| Toluene | 250 |
| Methylethyl ketone | 250 |
| Di-tertiarybutyl perbenzoate accelerate | 60 |

The solution of the resins and the accelerator in the solvent had a syrupy viscosity of about 470 centipoises at room temperature. The resin was knife-coated on to the carrier member as above described at a dry coating weight of 57 grains per 4″ x 6″ sheet followed by lamination of a woven fabric of glass strands weighing 9 grains per 4″ x 6″ sheet and the resin retentive mat employed in Example I. The composite sheet was oven dried for 7 minutes at 195° F., for 20 minutes at 170° F., and for 13 minutes at 150° F. to evaporate the solvent without curing the resin. The web was allowed to cool and then wound in roll form for storage and/or slitting into tapes of the desired width. The resinous sheet structure had a slightly tacky feel to the touch. It was easily strippable from the carrier.

The sheet structure of the present example is particularly suitable for the wrapping of armature coils of motors as above described in connection with FIGURES 1 and 2, the resin being cured upon subjection to a temperature of 250° F. for about 2 hours. The uncured sheet structures were found to be stable for periods well in excess of 6 months.

The following examples illustrate other types of stable heat-curable resin compositions which are suitable in the novel products hereof.

*Example III*

| | Parts |
|---|---|
| Heat-setting melamine-formaldehyde-butanol resin ("Melmac 248–5") | 80 |
| Epoxidized soya bean oil (Rohm & Haas, "Paraplex G-60") having about 275 grams/epoxide equivalent | 20 |
| Toluene solvent | 43 |

The solution of the resins dissolved in the solvent exhibited a thick syrupy viscosity of about 700 centipoises at room temperature. The resin-retentive mat of Example I was employed and a resinous sheet structure formed as there described. The dry coating weight of the resin was 50 grains per 4" x 6" sheet and the solvent was removed by heating the composite in a 150° F. oven for about 6 minutes. In use, the sheet was readily strippable from the carrier and resin composition cured to a tough infusible state upon heating for 3 hours at 250° F. Useful shelf life and stability of the uncured resin in the sheet structures of the present example is about three months.

*Example IV*

| | Parts |
|---|---|
| Diallyl phthlate monomer | 50 |
| Diallyl phthlate polymer (Machinery and Chemical Corp. "Dapon-60") having an iodine number of 55, a specific gravity of 1.259 and a softening point of 85-105° C. | 100 |
| Di-tertiarybutyl perbenzoate accelerator | 3 |
| Methylethyl ketone | 41 |
| Toluene | 41 |

The resin-retentive mat of Example I was impregnated as there described. The resin solution of the monomer, polymer and accelerator dissolved in the solvent had a light syrupy viscosity of about 200 centipoises at room temperature. The resin coating weight on a dry basis was 50 grains per 4" x 6" sheet, the drying being carried out in a 185° F. oven for 8 minutes. In use, the sheet structure was cured upon subjection to a temperature of 250° F. for 1 hour.

*Example V*

The resinous sheet structure of Example I was formed as described except that for the resin composition there employed was substituted the stable heat-curable resin employed in Example II. The coating weight on a dry basis was 52 grains per 4" x 6" sheet and the drying and curing conditions were as described in Example II.

*Example VI*

The woven fabric reinforced resinous sheet structure of Example II was prepared as there described except that instead the resinous composition of Example I was employed, the resin coating weight being 61 grains per 4" x 6" sheet. Drying and curing conditions were as described in Example I. This embodiment is particularly suitable for insulation in high-temperature alternating current electric motors.

*Example VII*

The woven fabric reinforced resinous sheet structure of Example II was prepared except that instead the resinous composition of Example III was employed and the drying and curing conditions there set forth were observed. The coating weight on a dry basis was 54 grains per 4" x 6" sheet.

*Example VIII*

The woven fabric reinforced resinous sheet structure of Example II was prepared as there described except that instead the resinous composition of Example IV was employed and the drying and curing conditions there set-forth were observed. The coating weight on a dry basis was 54 grains per 4" x 6" sheet.

In the preceding examples the fibrous resin-retentive material was impregnated with at least about 9-10 times its own weight in resin. When these structures were employed as insulation around electrical conductors and cured without externally applied pressure or confining molds, efficiently operating structures were obtained. The insulative portions were continuous and void-free. No evidence of entrapped air was seen. There was substantially no resin runoff during cure of the resin compositions.

In order to obtain a void-free insulation where no externally applied curing pressure is employed, we have found it necessary to use an impregnated mat structure which is completely filled with resin. Should an incompletely filled mat structure be employed, undesirable entrapped air will result in the cured insulative structure. On the other hand, where a filled resin retentive mat structure is employed having excess free resin present on the surface, resin runoff from the surface will result. Such runoff in no way adversely affects the resulting insulative structure since runoff occurs from the surface and not from within the insulative structure. Resin runoff which does occur is merely inconvenient and wasteful.

Although the structures hereof are especially suited to unconfined cure, it is not essential to do so. If desired a confining or a pressure mold may be employed. Such might be advisable, for example, where an exterior shape of exact tolerances is necessary. Also, the utility of our novel resinous sheet structures has been described in connection with a preferred use. It is apparent, however, that they are suitable for many other uses as well. For example, they are highly suited to be used as flat sheets in the formation of reinforced laminates, as repair patches for structures, etc.

Although the microfiber of the resin-retentive fibrous mat employed in the preceding examples had diameters in the order of .00003 inch, microfibers of other sizes also provide resin-retentive characteristics. In fact, microfibers having diameters smaller than the fibrous mat above employed exhibit even superior resin-retentive qualities. On the other hand, although microfibers larger than .00003 inch are resin-retentive to a somewhat lesser degree, microfibers having diameters as large as about .0001 inch are suitable, they being capable of retaining up to about 8 times their own weight when air-laid into a handleable mat. Where microfiber mats differing from the mat shown in the specific examples are employed, or where other reinforcing structures than the fabrics shown, such as aligned filaments, surface treated fiber mats, etc., are used, the amounts of resin composition necessary to completely fill the mat will vary from that shown. The same may be true to where different stable heat-curable resins are employed than those shown or where fibers or resin extenders are used. However, in each instance the proper amounts of resin necessary may be determined in accordance with the teachings herein set forth.

The length of the microfibers in the mat is not critical as far as the resin-retentive character is concerned. Any length of microfibers may be employed which may be drylaid into a handleable mat. We prefer to employ mats having fiber lengths within the range of about $\frac{1}{16}$ to $\frac{1}{2}$ inch, although shorter fibers may be employed where admixed with some fibers of longer length.

In some instances it may be desirable to replace a portion of the resinous composition with various of the well-known filler materials. Since in some instances the resin compositions employed are relatively expensive, it is desirable in commercial use to employ filler materials in the interests of economy. Of course, where the resulting sheet structure is to be employed as insulation for electrical conductors, any filler materials employed should be of a non-conducting and preferably of a high dielectric nature. One such filler is ground mica.

Herein we have generally described our invention and with the aid of examples specifically illustrated the same. It is not our intention, however, to be limited to the precise embodiments enclosed; rather we intend to be limited only by the scope of the appended claim.

We claim:

A stabilized resinous sheet material stabilized from resin runoff suitable for wrapping around electrical conductors to provide a substantially void-free insulative covering upon heating while unconfined, said sheet comprising the combination of a non-woven mat of discontinuous glass microfibers having diameters less than 0.0001 inch, said mat per se being further characterized in that it is free from binder resin and retained in mat form by intertangling of the fibers, and a heat curable temporarily heat liquefiable resin impregnating said mat and surrounding and embedding therewithin substantially every microfiber of said mat, and further including a reinforcing member superimposed upon said mat and having low resin-retentive characteristics formed of surface treated glass fibers having diameters in excess of about 0.0002 inch.

References Cited in the file of this patent

UNITED STATES PATENTS

| | | |
|---|---|---|
| 2,133,183 | Baird et al. | Oct. 11, 1938 |
| 2,199,811 | Wood | May 7, 1940 |
| 2,405,057 | Rosenstein et al. | July 30, 1946 |
| 2,407,549 | Gurwick | Sept. 10, 1946 |
| 2,489,242 | Slayter et al. | Nov. 22, 1949 |
| 2,525,644 | Brunson | Oct. 10, 1950 |
| 2,542,827 | Minter | Feb. 20, 1951 |
| 2,559,098 | Walz | July 3, 1951 |
| 2,567,186 | Cross et al. | Sept. 11, 1951 |
| 2,606,134 | Sanders | Aug. 5, 1952 |
| 2,622,656 | Pinsky | Dec. 23, 1952 |
| 2,658,848 | Labino | Nov. 10, 1953 |
| 2,732,324 | Morris | Jan. 24, 1956 |
| 2,784,763 | Shorts | Mar. 12, 1957 |
| 2,794,759 | Dildilian | June 4, 1957 |
| 2,794,760 | Wilson | June 4, 1957 |

FOREIGN PATENTS

| | | |
|---|---|---|
| 530,369 | Great Britain | Dec. 11, 1940 |

OTHER REFERENCES

"4 Ways of Building Plastic Boats," J. B. Alfers, Modern Plastics (November 1952), pages 102–106, volume 30, #3.